3,689,229
HOT WATER SULPHUR MELTER
Robert E. Lane, Houston, and Xerxes T. Stoddard, Rosenberg, Tex., assignors to Allied Chemical Corporation, New York, N.Y.
Filed Mar. 9, 1971, Ser. No. 122,404
Int. Cl. C01b 17/02, 17/08
U.S. Cl. 23—308 S          5 Claims

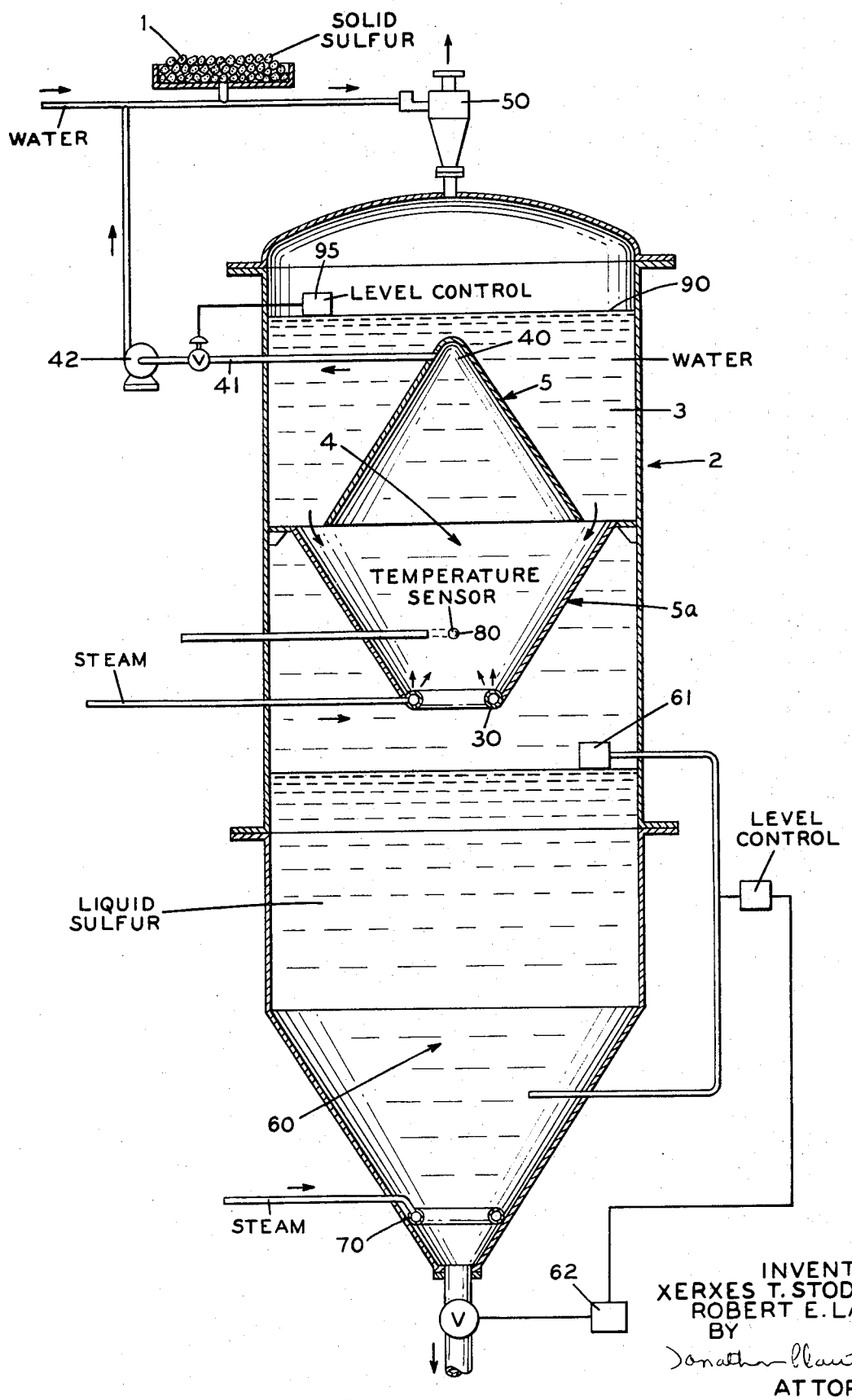

ABSTRACT OF THE DISCLOSURE

A method of melting sulphur in which solid sulphur is introduced into a pressure vessel containing hot water of a temperature in the range of about 280° to 320° in the sulphur melting zone and liquid sulphur is removed from the zone after melting.

---

This invention relates to the melting of solid sulphur, and more particularly, to the melting of solid sulphur in a pressure vessel of hot water, into which the sulphur is introduced.

At the present time in the prior art solid sulphur is typically melted to liquid form in a container to which it is added, that container having heating coils or other heat transfer means therein. In such containers the sulphur temperature rises until the temperature thereof reaches the melting point, at which point the solid sulphur nearest the coils or other heating means melts. That melted sulphur then transmits heat to other solid sulphur to melt it. Generally, then you have a liquid sulphur to solid sulphur heat exchange in melting the solid sulphur and the heat transfer rate in such a sulphur melting system is relatively slow. Furthermore, since the solid sulphur in the sulphur melting systems of the prior art passes through the temperature range at which water changes to steam (212° F. at atmospheric pressure), the heat transfer rate is further retarded because of the flashing as the water reaches 212° F. Such heat to convert the water to vapor is not utilized to convert the solid sulphur to liquid sulphur. In addition, prior art sulphur melting apparatus of the type described also are highly inefficient, since they require cleaning, complicated means to remove the liquid sulphur, etc.

In order to overcome the above described disadvantages as well as to obtain other advantages as will become apparent, applicant has designed a new method of melting solid sulphur.

BRIEF DESCRIPTION OF THE INVENTION

Briefly, in one embodiment, of my invention, the solid sulfur is introduced into a pressure vessel containing hot water, which is of a temperature to melt the sulfur as it is directed by a pair of cones oppositely directed, and agitated as a result of steam introduction. This method of melting sulfur leads to the following advantages, among others, which method will be described in more detail hereinafter with relation to the detailed description of preferred embodiments of the invention:

(1) The heat transfer rate from liquid sulfur to solid sulfur is about one-fifth of the heat transfer rate from water at sulfur melting temperature to solid sulfur. Therefore, you increase the capacity of equivalent equipment about five times as a result of the adoption of the sulfur melting system utilizing the faster, better heat transfer rate of hot water to solid sulfur contact, as compared to liquid sulfur to solid sulfur contact.

(2) The moisture in the solid sulfur will not convert to vapor, since the temperature of the water adjacent the melting sulfur is at the melting temperature of the sulfur (the water is under a pressure head), so that said moisture simply cannot convert to vapor. Since the temperature at the top of the column is below the boiling temperature of the water, no flashing of water at the top of the column will take place.

(3) Since the melting of the sulphur according to this invention is contained within water, less foaming will occur at the top of the column, since conversion of moisture within the sulphur to flashing vapor which aids in forming foam will not take place, as discussed in the preceding paragraph. In the prior art, foam will appear at the top of the liquid sulphur level, especially if the solid sulphur has 1½% or more moisture.

(4) The caking of the solid sulphur or semi-solid sulphur which occurs in the container melting process of the prior art does not occur in the process of our invention, since the solid sulphur changes to a liquid sulphur within the melting liquid.

DETAILED DESCRIPTION OF THE INVENTION

The figure of the drawing shows a pressure vessel embodiment of the invention.

According to one embodiment of the invention, solid sulphur 1 is added to a pressure vessel 2. Said vessel 2 is filled with water 3. The water is at a level 90 so as to be primarily located in part within sulphur melting zone 4, a part of which is outlined by two oppositely directed truncated cones 5 and 5a. The temperature in the sulphur melting zone is above the sulphur melting temperature, that is about 280°–320° F.

Steam is introduced into said hot water, preferably at 30, located adjacent the lower extremity of the inverted truncated cone 5a. Excess hot water is removed from the vessel, preferably at the top of the truncated cone 5, as shown at 40, from a point within the cone. A draw off line 41 for removal of the excess water and controlled by the float 95 then leaks the drawn off water for recirculation by a pump 42, for example, if so desired, as will be described hereafter.

The pressure within the column 2 is such that the water in the column, supplies the required sulphur melting temperatures in the zone 4. The column is closed at the top thereof so as to produce artificially the pressure required to reach the sulphur melting temperatures in the sulphur melting zone, but without having significant flashing at the top of the column.

Connected to the column, preferably, is a desander 50 (a concentrating device) which receives the solid sulphur in a water slurry (water from the draw-off line 41 is shown as being combined with the solid sulfur for transportation thereof to the desander). In the desander, most, in one embodiment say 80%, of the water is removed from the slurry, as by centrifugal action on the slurry, and the sulfur and water remaining therein is then introduced into the chamber or column 2 from the desander. Use of the desander allows for easy movement of the sulfur (with water) and removal of a substantial part of the water to reduce the heat required. Of course, alternately, the slurry could be introduced directly into the vessel 2 or the solid sulfur could otherwise be transported to the vessel.

Liquid sulfur descending from the zone 4 through the opening in the inverted truncated cone is collected in a pool 60 in the lower part of the vessel which is periodically or continuously drained. The level of the pool 60 may be measured and controlled as by use of a float 61 connected, for example, electrically to a control valve 62. A heat coil arrangement 70 may be utilized in the pool to keep it at molten temperature, such coil for example being steam heated.

Water from the desander removed from the slurry may, of course, be recirculated.

The level of the hot water in the vessel may be monitored and controlled, as for example by a float 95. A temperature sensor 80 may control steam introduction, as shown.

By passing the slurry first down the truncated cone 5 even distribution of slurry is effected. The slurry drops from the cone 5 into the area within the cone 5a. In this area the slurry undergoes great agitation, as well as heating, due to the agitating effect of the entering steam on the water in the zone. The truncated cone 5 acts as a separator, distributing the heavy sulfur containing slurry downward to the opening in the lower cone 5a, while serving as a joint for the relatively clear water at 40.

Since the liquid sulfur is heavier then water, it descends through the inverted truncated cone opening, while water is pulled from inside the cone 5 to be drawn off. The separation of water and sulfur is thus easily effected.

Preferably, the walls of the pressure vessel, which may be made, for example, of cast iron or stainless steel, are lined so as to prevent corrosion, for example, with cement such as "lumnite."

In such a method of melting sulphur as just described with relation to the embodiment shown in the drawing, the transfer rate of the heat from the hot water (for example at 300° F.) to the solid sulphur to melt it is .395 B.t.u./(hr.) (ft.$^2$) (° F./ft.) see Perry's Chemical Engineers Handbook, 3rd Edition, 1960, page 459. In comparison, the transfer rate of heat from liquid sulphur (for example at 300° F.) to solid sulphur (according to the processes of the prior art discussed earlier) is .079 B.t.u./(hr.) (ft.$^2$) (° F./ft.), see the Sulfur Data Book, 1954, page 56. Thus the comparison of the rate of heat transfer of hot water to sulphur as compared to liquid sulphur to solid sulphur is .395 to .079 or about 5 to 1. This substantially better heat transfer rate according to the method of this invention results in an increase in the capacity of any given volume of solid sulphur melting equipment, since there is a speeding of melting of the solid sulphur by this method.

Although this invention is described with relation to particular apparatus, it is not intended that this invention be limited except by the following claims.

We claim:

1. A method of melting solid sulphur comprising the steps of introducing said solid sulphur into a pressure vessel containing heated water, passing said sulfur down the outside of an upper downwardly outwardly extending cone and from said cone down to the inside of a lower downwardly inwardly extending inverted truncated cone, said cones adjacent to one another and forming together therewithin an inner zone, heating the water in the vessel, said zone being occupied by water, said water in said zone heated to a temperature in the range of about 280° to 320° F., by the introduction of steam therein, agitating the water with the steam, removing liquid sulphur from the zone through said truncated cone into a pool of molten sulfur in the lower portion of said, and then from the bottom of said vessel.

2. A method as set forth in claim 1, further comprising the steps of crushing the sulphur and adding water thereto to make it into a slurry before introduction thereof.

3. A method as set forth in claim 2, further comprising the steps of introducing said slurry into a concentrating device before introduction into the vessel for removal of a substantial portion of the water therefrom, and introducing the slurry, with water removed, into the vessel from the concentrating device.

4. A method as set forth in claim 3, further comprising the steps of removing sulphur from the bottom of the vessel continuously.

5. A method as set forth in claim 3, further comprising the step of removing sulphur from the bottom of the vessel column in batches.

References Cited

UNITED STATES PATENTS

| | | | |
|---|---|---|---|
| 3,556,728 | 1/1971 | Bailey | 23—308 S |
| 3,539,539 | 11/1970 | Goetzke | 23—270 |
| 2,149,373 | 3/1939 | Vincent | 23—308 S |
| 1,365,922 | 1/1921 | Katz | 23—308 S |
| 1,586,539 | 6/1926 | Thornton | 23—308 S |
| 3,634,046 | 1/1972 | Allen | 23—229 |
| 2,731,332 | 1/1956 | Ackert | 23—308 S |
| 3,551,333 | 12/1970 | Stoddard | 23—312 S |
| 3,607,143 | 9/1971 | Wierman | 23—312 S |

NORMAN YUDKOFF, Primary Examiner

S. J. EMERY, Assistant Examiner

U.S. Cl. X.R.

23—312 S, 229, 280, 293 S